United States Patent [19]

Ohlson

[11] Patent Number: 5,207,466
[45] Date of Patent: May 4, 1993

[54] PRONG-EQUIPPED GARDEN TOOL

[76] Inventor: Paul W. Ohlson, 3143 Elder La., Franklin Park, Ill. 60131-2512

[21] Appl. No.: 887,845

[22] Filed: May 26, 1992

[51] Int. Cl.$^5$ .............................................. A01B 1/16
[52] U.S. Cl. .................................... 294/61; 172/21; 172/378; 294/50.6
[58] Field of Search ................................... 294/49–50.8, 294/51, 55.5, 61, 120, 126; 111/92, 99, 101, 106, 115; 172/21, 22, 25, 371, 378; 254/132

[56] References Cited

U.S. PATENT DOCUMENTS

| | | | |
|---|---|---|---|
| 315,407 | 4/1885 | Groom | 294/57 |
| 717,353 | 12/1902 | Cox . | |
| 840,903 | 1/1907 | Bucknell | 294/50.7 |
| 1,229,843 | 6/1917 | Whitaker . | |
| 1,398,342 | 11/1921 | Pleaue . | |
| 1,549,198 | 8/1925 | Haney | 294/50.5 |
| 2,086,422 | 7/1937 | Klimt . | |
| 2,680,643 | 6/1954 | Cravotta | 294/50.6 |
| 2,689,131 | 9/1954 | Priest . | |
| 2,791,879 | 5/1957 | Truran | 294/50.6 X |
| 2,809,067 | 10/1957 | Macchi | 294/50.7 |
| 2,862,755 | 12/1958 | Gulden | 294/61 |
| 3,333,881 | 8/1967 | Hollinger | 294/50.6 X |
| 3,486,265 | 12/1969 | Cheesebrew | 294/61 X |
| 3,545,551 | 12/1970 | Niemeyer . | |
| 4,641,712 | 2/1987 | Cravotta | 294/50.6 X |
| 5,005,888 | 4/1991 | Parks et al. | 294/50 |

FOREIGN PATENT DOCUMENTS

| | | | |
|---|---|---|---|
| 809765 | 3/1937 | France | 295/50.6 |
| 813630 | 5/1959 | United Kingdom | 294/61 |
| 2119211 | 11/1983 | United Kingdom | 294/50.5 |

*Primary Examiner*—Johnny D. Cherry
*Attorney, Agent, or Firm*—Hill, Steadman & Simpson

[57] ABSTRACT

A garden tool having an elongate shaft with a handle on one end of the shaft and the opposite end of the shaft having a plurality of circumferentially spaced generally axially extending cultivating and weeding prongs, and the shaft and handle permitting a gardener to use the tool in a generally upright position for soil loosening, cultivating and weeding by rotary and rocking maneuvers of the handle and agitating the prongs, and for optionally spearing trash or aerating sod.

12 Claims, 1 Drawing Sheet

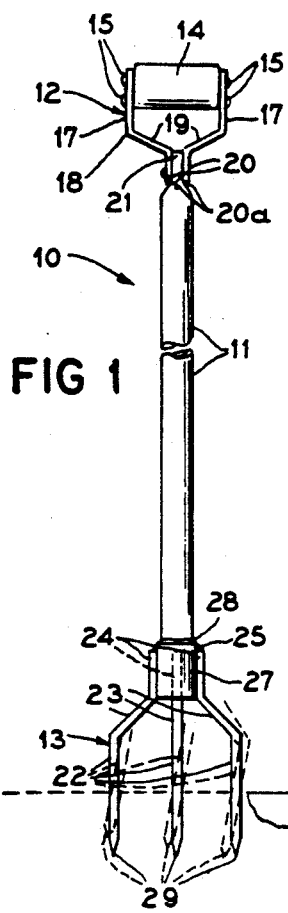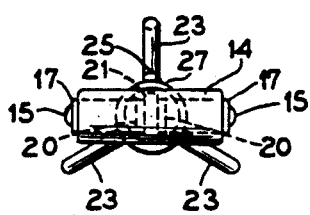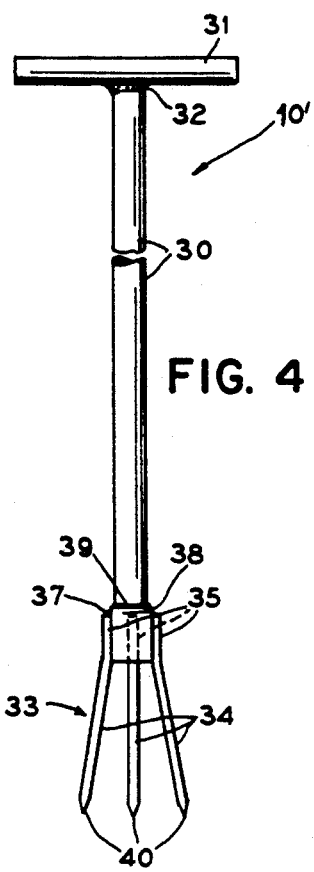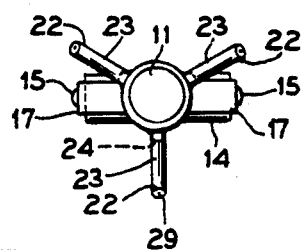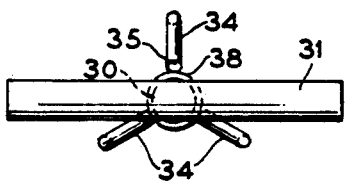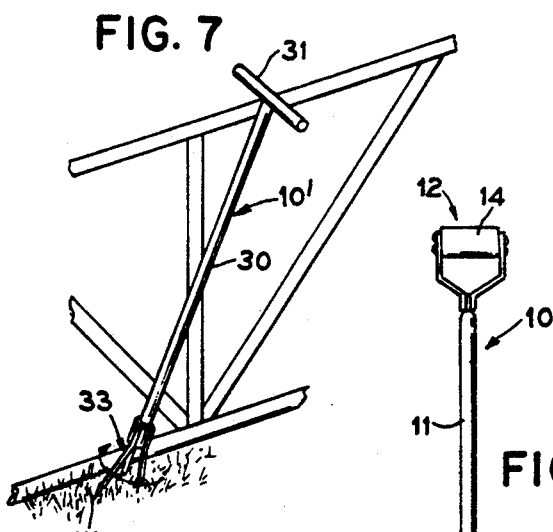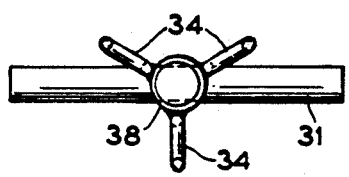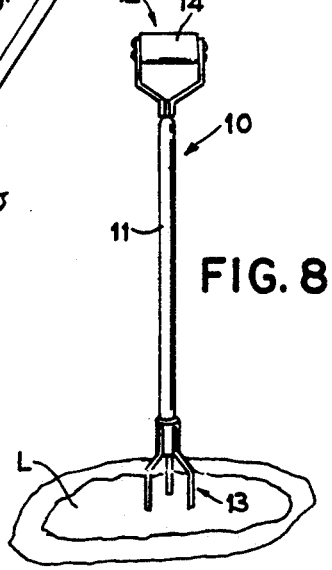

PRONG-EQUIPPED GARDEN TOOL

BACKGROUND OF THE INVENTION

Field of the Invention

The present invention relates to a garden tool of the kind that is especially useful for manual cultivating and weeding.

Garden tools such as spades, forks, hoes, weeders, tillers, and the like, are well known. Some of these tools are commonly used for cultivating and weeding. The most commonly used tool for cultivating and weeding is some form of hoe. There are also earth scratching cultivators and weeders that have tines or thin sharpened prongs extending claw-like at one end of a handle which may be of a length so that a person can use the tool in a generally standing position, or may have a short handle to be used by a person in a squatting or kneeling position.

Where the tool must be worked by dragging or pushing it across the soil whether in a standing, bending or squatting maneuver, some gardeners find the strain intolerable.

It is therefore apparent that there is need for a garden cultivating and weeding tool that will overcome the deficiencies and shortcomings of the prior tools.

Summary of the Present Invention

An important object of the present invention is to provide a new and improved prong-equipped garden tool for cultivating and weeding, and possibly other optional purposes.

In accordance with the principles of the present invention, there is provided a garden tool having an elongate shaft, and comprising a handle on one end of the shaft, and the opposite end of the shaft having a plurality of circumferentially spaced generally axially extending cultivating and weeding prongs, the shaft and handle permitting a gardener to use the tool in a generally, upright position, for soil loosening, for cultivating and weeding by rotary and rocking maneuvers of the handle and shaft and agitating the prongs, and for optionally spearing trash or aerating sod.

BRIEF DESCRIPTION OF THE DRAWINGS

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

FIG. 1 is an elevational view of a prong-equipped garden tool embodying features of the invention;

FIG. 2 is a top plan view of the tool shown in FIG. 1;

FIG. 3 is a bottom plan view of the tool shown in FIG. 1;

FIG. 4 is an elevational view of a slight modification of prong-equipped garden tool embodying the present invention;

FIG. 5 is a top plan view of the tool shown in FIG. 4;

FIG. 6 is a bottom plan view of the tool shown in FIG. 4;

FIG. 7 is a schematic view showing how the tool is adapted to be used for uprooting weeds having a developed root system; and FIG. 8 is a schematic view showing use of the tool as a trash spear.

DETAILED DESCRIPTION

Referring to FIGS. 1-3, a tool 10 embodying the present invention, and adapted for use in a generally upright position, comprises an elongate shaft 11 having a handle 12 on one end and a plurality of earth working prongs 13 at the opposite end.

In a desirable form, the handle 12 comprises an elongate transverse grip 14 which is preferably of generally oval shape in cross section and with the major dimension of the oval disposed in the direction of the axis of the shaft 11, i.e. in an up and down direction. The hand grip 14 is secured as by means of screws 15 (two at each end of the handle) to and between spaced upstanding arms 17 of a generally U-shaped bracket structure 18 having transverse base bar means 19. Integrally formed therewith is a pair of depending spaced attachment ears 20 by which the bracket structure 18 is secured to the upper end of the shaft 11. Where the shaft 11 is wood, attachment screw means may be used. As shown, the handle 11 is formed from suitable metal tubing which may be provided with a flattened upper end portion 21 and to which the attachment ears 20 may be secured as by means of brazing or welding 20a, or spot welding. Of course, if preferred, the upper end of the shaft 11 may be left generally plain, so that alternately or optionally the upper end may serve as a handle without an attached handle.

Each of the prongs 13 comprises a rod-like body 22 projecting generally axially downwardly from a generally downwardly and outwardly slanting shoulder portion 23 having an upwardly extending elongated attachment finger 24 secured, as shown, fixedly as by means of brazing or welding 25 parallel along the length of the tubular outer surface of a bushing or collar 27 which encircles the lower end of the shaft 11 and to which it is secured as by means of welding 28, where the shaft is metal. If it is preferred to have the shaft 11 wooden, suitable bolt means may be employed to secure the collar 27 to the shaft. The prongs 13 are located with the prong bodies 22 substantially parallel to one another and in substantially equidistantly circumferentially spaced relation. At their lower ends, the prong bodies 22 are provided with sharpened tips 29.

In a preferred construction, the tool 10 may be of about thirty-six inch total length and the handle 12 about three to six inches long in its dimension transverse to the shaft 11 axis. The prongs 13 are desirably three in number, in equally circumferentially spaced relation, and the prong bodies 22 are preferably disposed in a circumference of a diameter at least about equal to the length of the handle 12. Quarter inch diameter metal rod stock is suitable for the prongs 13. The length of the prongs between the juncture between the shoulder portions 23 and the fingers 24 and the tips 29 is preferably about five inches. Thereby, the tool 10 is well proportioned for use by an erect gardener for soil loosening, cultivating and weeding by thrusting the prongs 13 into soil exemplified at S in FIG. 1 and working the tool 10, and thereby agitating the prongs, for breaking the soil. If the soil is too hard to be conveniently broken up by a rotary maneuver, the tool may be rocked so that the prongs will provide a soil breaking leverage. Of course, if it is preferred to have the tool 10 of a shorter length, for any reason, the shaft 11 may be optionally proportioned shorter.

What may be referred to as a pocket within the perimeter defined by the prongs 13 can be easily cleaned of any clods or gummy soil trapped therein, by simple cleaning maneuvers such as tapping the prongs on the soil or against a stake or post or by dislodging the material by means of a stick or even a similar auxiliary tool 10 which may be on hand to assist in using either of the tools where a helper device is needed for pushing vegetation aside to gain access to soil adjacent to the plants for cultivation and weeding. Dislodgement from the prong pocket may be facilitated by providing the prong bodies 22 with a slightly splayed relation.

Although primary intended use for the tool 10 is for garden soil breaking or agitation, cultivation and weed control, another valuable use is for assisting in hole digging such as for installing fence posts. There the tool readily loosens the soil at the bottom of the hole so that a post hole digger can easily remove the loosened soil. This takes considerably less effort than trying to loosen the hole-bottom soil by jamming the hole digger into relatively hard soil.

Another use for the tool 10 is in loosening soil in bare spots in a lawn, to assist in reseeding or resodding. Further, the tool is valuable for aerating turf by striking holes into the turf by means of the prongs 13.

Still another use for the tool 10 is as a spear for spilled or wind scattered litter L (FIG. 8) which may be deposited on lawn areas or along hedges or fences.

In a slightly modified tool 10' as shown in FIG. 4, a shaft 30 similar to the shaft 11 in FIG. 1 carries at its upper end a generally T-shaped handle 31 which may be secured to the upper end of the shaft 30 by any suitable means such as welding 32. At the lower end of the shaft 30 are attached prongs 33, each of which has an elongate rodlike body 34 which extends in a flaring or splayed relation from an upper end finger 35 which is secured as by means of brazing or welding 37 to a bushing or collar 38 which is engaged about the lower end portion of the shaft 30 and secured thereto as by means of welding 39. At their splayed lower ends the prong bodies 34 have sharpened points 40 to facilitate soil penetration. Similarly as the prongs 13 in FIG. 1, the prongs 33 comprise a plurality of preferably three located in circumferentially spaced relation. Use of the tool 10' is adapted to be effected in substantially the same manner as described for the tool 10.

Weeds W (FIG. 7) with developed root systems, growing near or under fences, walls, or the like, can be readily removed with the tool 10' by inserting the prongs 34 at about a 45 degree angle into the soil base in which the weeds are rooted and then rotating the tool leftward or rightward, whereby the weeds are wound onto the prongs and the weeds pulled out by the roots or snapped off at or near the surface. The pulled up ball of weeds may then be removed by counter-rotating the tool or pulling the material off of the prongs 34. Smaller vegetation groups can more easily be dislodged by cultivation weeding with the tool 10 in generally vertical position as already described.

From the foregoing it will be apparent that applicant's tools 10 and 10' provide new and improved structure, and function in ways that are a substantial improvement for at least users who prefer to perform the functions in an erect manner or upright manner.

Whereas both of the tools 10 and 10' have been disclosed as having the prong structure fixedly attached to the lower end of the shaft, attachment may also be effected, as is well known to the art, by means of detachable coupling devices where it is desired to use the handle shaft for attachment to other garden tools such as spades, hoes, rakes, and the like. In other words, the prong structures of the tools 10 and 10' may be part of a kit of different earth working, cultivating and weeding implement attachments.

It will be apparent that various modifications and/or additions may be made in the structure of the invention without department from the essential features of patentable novelty involved, which are intended to be defined and secured by the appended claims.

I claim as my invention:

1. A garden tool to be used in a generally upright position and having an elongate shaft, and comprising:
   a handle on an upper end of said shaft;
   a lower end of said shaft having secured thereabout a bushing providing an outer elongate tubular surface;
   a plurality of circumferentially spaced generally axially downwardly extending cultivating and weeding prongs projecting from said bushing;
   said prongs having elongate upper end finger portions extending along the length of and engaging against said bushing tubular outer surface; and
   brazing or welding securing said finger portions to said tubular bushing outer surface;
   said shaft and handle permitting a gardener to use the tool in a generally upright position, for soil loosening, for cultivating and weeding by rotary and rocking maneuvers of said handle and shaft and agitating said prongs, and for optionally spearing trash with said prongs or aerating sod by thrusting said prongs into the sod for making sod aerating holes in the sod.

2. A garden tool according to claim 1, wherein said prongs include rod like body portions extending in substantially parallel downward relation.

3. A garden tool according to claim 1, wherein said prongs have body portions which are in a splayed orientation.

4. A garden tool according to claim 1, wherein said shaft is of a length to enable use of the tool by a gardener standing erect.

5. A garden tool according to claim 1, comprising a pocket within a perimeter defined by said prongs, and from which pocket any material trapped therein during operation of the tool can be easily dislodged.

6. A garden tool according to claim 1, wherein said prongs have portions thereof extending laterally from said finger portions.

7. A garden tool according to claim 6, wherein said laterally extending portions of said prongs comprise shoulders, and elongate body portions of the prongs extending angularly from said shoulders in substantially axially oriented direction.

8. A garden tool according to claim 6, wherein said prongs comprise elongate body portions splayed relative to the shaft axis.

9. A garden tool according to claim 1, wherein said shaft comprises a tubular metal member and said handle comprises a member welded to said shaft.

10. A garden tool according to claim 9, wherein said handle has a generally U-shaped bracket structure including attachment ears welded to said shaft.

11. A garden tool according to claim 1, having three said prongs circumferentially spaced.

12. A garden tool according to claim 1, wherein said handle comprises a T-head member secured intermediate its length to said shaft.

* * * * *